United States Patent
Lee et al.

(10) Patent No.: US 7,248,765 B2
(45) Date of Patent: Jul. 24, 2007

(54) TEMPERATURE-INSENSITIVE POLYMERIC OPTICAL AWG DEVICE AND MANUFACTURING METHOD THEREFOR

(75) Inventors: Jong Moo Lee, Daejeon (KR); Sun Tak Park, Daejeon (KR); Yong Soon Baek, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 11/361,204

(22) Filed: Feb. 23, 2006

(65) Prior Publication Data
US 2006/0274995 A1     Dec. 7, 2006

(30) Foreign Application Priority Data
Jun. 3, 2005     (KR) ............... 10-2005-0047918

(51) Int. Cl.
*G02B 6/34*     (2006.01)
(52) U.S. Cl. .................................................. 385/37
(58) Field of Classification Search ............... 385/37, 385/39, 129–132
See application file for complete search history.

(56) References Cited

U.S. PATENT DOCUMENTS

| | | | |
|---|---|---|---|
| 6,571,037 B1 * | 5/2003 | Rogers et al. ............... 385/37 |
| 6,757,469 B2 | 6/2004 | Bauer et al. | |
| 6,853,773 B2 * | 2/2005 | Lin .............................. 385/39 |

2003/0123828 A1     7/2003   Garito et al.

FOREIGN PATENT DOCUMENTS

KR         100164087 B1         9/1998

OTHER PUBLICATIONS

N. Keil, et al., "Athermal all-polymer arrayed-waveguide grating multiplexer", Electronics Letters Apr. 26, 2001, vol. 37, No. 9 (pp. 579-580).
Renyuan Gao, et al., "Low-Insertion Loss Athermal AWG Multi/Demultiplexer Based on Perfluorinated Polymers", Photon-X, Inc. (2 pp.), Sep. 2002.
Jong-Moo Lee, et al., "Athermalized Polymeric Arrayed-Waveguide Grating by Partial Detachment from a Si Substrate", ETRI Journal, vol. 26, No. 3, Jun. 2004 (pp. 281-284).

* cited by examiner

*Primary Examiner*—Sarah Song
(74) *Attorney, Agent, or Firm*—Blakely Sokoloff Taylor & Zafman

(57) ABSTRACT

Provided are a temperature-insensitive polymeric optical AWG device and method of manufacturing the same. The temperature-insensitive polymeric optical AWG device includes: polymeric grating channel waveguides interposed between free propagation slab regions on a substrate between the input and output waveguides and having different lengths; a plurality of hollow trenches formed by selectively etching a surface of the substrate under the polymeric grating channel waveguides and allowing the polymeric grating channel waveguides to freely thermally expand from the substrate depending on a temperature variation; and a shield layer shielding entrances of the hollow trenches so that the polymeric grating channel waveguides do not flow into the hollow trenches.

20 Claims, 7 Drawing Sheets

TEMPERATURE-INSENSITIVE POLYMERIC OPTICAL AWG DEVICE AND MANUFACTURING METHOD THEREFOR

CROSS-REFERENCE TO RELATED PATENT APPLICATION

This application claims the benefit of Korean Patent Application No. 10-2005-0047918, filed on Jun. 3, 2005, in the Korean Intellectual Property Office, the disclosure of which is incorporated herein in its entirety by reference.

BACKGROUND OF THE INVENTION

1. Field of the Invention

The present invention relates to an optical device, and more particularly, to a temperature-insensitive polymeric optical arrayed waveguide grating (AWG) device having an optical characteristic that does not vary with a temperature variation due to a lower structure and a method of manufacturing the same.

2. Description of the Related Art

Wavelength division multiplexing (WDM) systems are used to transmit a large amount of information. Examples of optical devices widely used in optical communications include optical planar waveguides, AWG devices, and the like. In particular, a technology for using polymeric AWG devices with MUX/DeMUX in WDM optical communications has attracted much interest.

Polymeric optical devices are more easily manufactured than silica optical devices and thus have attracted attention for use in optical communications. Nevertheless, the application range of polymeric optical devices is considerably restricted due to the relatively greater temperature dependence than silica optical devices.

For example, in the case of a silica AWG device, a variation of a central wavelength with a temperature is about 0.01 nm/° C. However, in the case of a polymeric AWG device, although a variation of a central wavelength with a temperature depends on the type of a polymeric material, the variation is generally about −0.1 nm/° C. Thus, it may be estimated that the temperature dependence of the polymeric AWG device is 10 times higher that of the silica AWG device.

Various methods of improving the temperature dependence of such AWG devices have been proposed. Also, various studies for effectively reducing the temperature dependence of polymeric optical devices and polymeric AWG devices used as a MUX/DeMUX in WDM communications have been performed.

For example, a method of changing a material of a substrate under a waveguide or adding a new layer having a different thermal expansion coefficient has been considered. A substrate having an appropriate characteristic must be found to reduce the temperature dependence. Also, in the case where the thermal expansion coefficient of a polymer constituting a waveguide is greatly different from a thermal expansion coefficient of the substrate, the substrate may be bent during a subsequent manufacturing process.

Accordingly, a method of effectively reducing the temperature dependence of a polymeric waveguide is required. In particular, a method of reducing the temperature dependence of a polymeric AWG device used as a MUX/DeMUX in temperature-sensitive WDM optical communications is required.

SUMMARY OF THE INVENTION

The present invention provides a temperature-insensitive polymeric optical AWG device and a method of manufacturing the temperature-insensitive polymeric optical AWG device.

According to an aspect of the present invention, there is provided an optical AWG (arrayed waveguide grating) device including: a substrate; an input waveguide formed on the substrate; an output waveguide formed on the substrate so as to correspond to the input waveguide; polymeric grating channel waveguides interposed between free propagation slab regions on the substrate between the input and output waveguides and having different lengths; a plurality of hollow trenches formed by selectively etching a surface of the substrate under the polymeric grating channel waveguides and allowing the polymeric grating channel waveguides to freely thermally expand from the substrate depending on a temperature variation so as to compensate for refractive indexes of the polymeric grating channel waveguides varying with the temperature variation; and a shield layer shielding entrances of the hollow trenches so that the polymeric grating channel waveguides do not flow into the hollow trenches, so as to separate the polymeric grating channel waveguides from the substrate.

According to another aspect of the present invention, there is provided a method of manufacturing an optical AWG device, including: forming polymeric grating channel waveguides interposed between free propagation slab regions on a substrate between input and output waveguides and having different lengths; selectively etching a surface of the substrate to form under the polymeric grating channel waveguides a plurality of hollow trenches allowing the polymeric grating channel waveguides to freely thermally expand from the substrate depending on a temperature variation so as to compensate for refractive indexes of the polymeric grating channel waveguides varying with temperature; and adhering a shield layer shielding entrances of the hollow trenches so that the polymeric grating channel waveguides do not flow into the hollow trenches, so as to separate the polymeric grating channel waveguides from the substrate.

The hollow trenches may be arrayed in a direction along which the polymeric grating channel waveguides extend.

The hollow trenches may be arrayed so as to have different length proportional to length differences among the polymeric grating channel waveguides.

The hollow trenches may be partially arrayed in a region in which the polymeric grating channel waveguides have different lengths.

The hollow trenches may be arrayed under one of the polymeric grating channel waveguides so that the polymeric grating channel waveguides are supported by a portion of a surface of the substrate between the hollow trenches.

The shield layer may include a dry film.

The method may include forming a filler filling the hollow trenches, the filler being made of a material having a different thermal expansion coefficient from the substrate to control thermal expansions of the polymeric grating channel waveguides.

The filler may include a polymer having a greater thermal expansion coefficient than the substrate.

The forming of the polymeric grating channel waveguides may include: forming a polymer lower cladding layer; forming a polymer core on the polymer lower cladding layer; and forming a polymer upper cladding layer covering the core.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
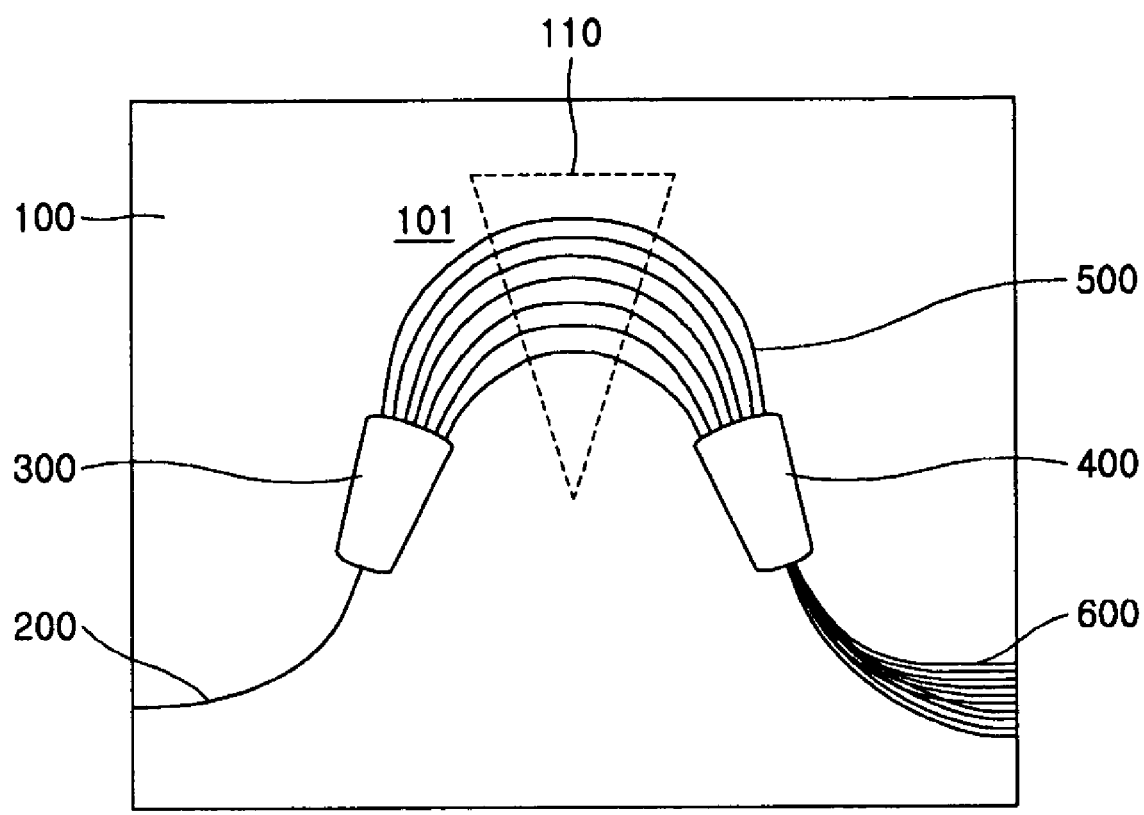
FIGS. 1 through 3 are schematic views illustrating a polymeric optical AWG device according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In the present invention, an array of hollow trenches is formed in a portion of a substrate to adjust a thermal expansion of a polymeric waveguide and improve a temperature dependence of a polymeric optical device. The array of the hollow trenches formed in the substrate allows the polymeric waveguide to thermally expand according to a temperature variation to appropriately offset a refractive index variation with temperature.

Polymers used for constituting a polymeric optical device have a relatively great thermal expansion coefficient within a range between 80 ppm/° C. and 100 ppm/° C. The substrate in which the polymeric optical waveguide is formed has a relatively greater volume than the polymeric optical waveguide, and thus the thermal expansion of the polymeric optical waveguide is limited with temperature. Since the polymeric optical waveguide is positioned on the substrate, the thermal expansion of the polymeric optical waveguide and a length variation due to the thermal expansion substantially depends on the length variation caused by the temperature variation of the substrate.

In the present invention, the hollow trenches are arrayed in the substrate under the polymeric optical waveguide to allow the polymeric optical waveguide to appropriately thermally expand irrespective of the substrate. In other words, a portion of the polymeric optical waveguide positioned on the hollow trenches of the substrate may relatively freely thermally expand without a partial contact with the substrate.

It can be understood that the hollow trenches in the substrate are for allowing the polymeric optical waveguide on the hollow trenches to thermally expand with the temperature variation. Areas, lengths, widths, depths, and/or distances of the hollow trenches can be adjusted to adjust an area of a portion in which thermal expansion of the polymeric optical waveguide is allowed, so that the length variation caused by the thermal expansion of the polymeric optical waveguide appropriately offsets the refractive index variation caused by the temperature variation of the polymeric optical waveguide.

If a polymer film used in the polymeric optical waveguide may be substantially separated from the substrate, a wavelength of the polymeric optical waveguide is changed from a negative number, for example, −0.1 nm/° C., to a positive number, for example, about +0.5 nm/° C., according to the temperature. Thus, a length variation of the polymeric optical waveguide caused by the thermal expansion may be adjusted so that the refractive index variation caused by the temperature variation of the polymeric optical waveguide is offset by the length variation caused by the thermal expansion of the polymeric optical waveguide according to the temperature variation.

The length variation caused by the thermal expansion of the polymeric optical waveguide caused by the temperature variation may be adjusted by varying the lengths, widths, distances, depths and/or the number of hollow trenches in the substrate, i.e., a substantial separation of the polymeric optical waveguide from the substrate.

A substrate formed of a specific material having a specific thermal expansion coefficient may be used to reduce the temperature dependence of the polymeric optical device. However, it is generally difficult to find a material having a thermal expansion coefficient capable of appropriately and/or precisely compensating for a refractive index variation caused by a temperature variation of the polymeric optical waveguide. Also, even though such material having the specific thermal expansion coefficient is found, it is very complicated to substantially use the substrate formed of the specific material in the manufacturing process of the polymeric optical device. Also, a large number of factors must be considered.

However, in the present invention, a silicon wafer or a polymer substrate is used and hollow trenches are arrayed in a surface of the substrate positioned under a portion of an area in which polymeric optical waveguides are arrayed. Thus, even in a case where a thermal expansion of the specific material constituting the substrate does not appropriately offset the refractive index variation caused by the temperature variation of the polymeric optical waveguide, a length variation caused by the temperature variation can be adjusted to appropriately offset the refractive index variation of the polymeric optical waveguide.

Accordingly, a substrate formed of a specific material having a specific thermal expansion coefficient can be used and/or a layer formed of a specific material having a specific thermal expansion coefficient can be added so as to reduce the temperature dependence of the polymeric optical waveguide.

A layer can be additionally formed of a material having a different thermal expansion coefficient from the substrate and/or the polymeric optical waveguide inside the hollow trenches arrayed in a portion of an area in which optical waveguides are arrayed to adjust a thermal expansion.

Figure 2:
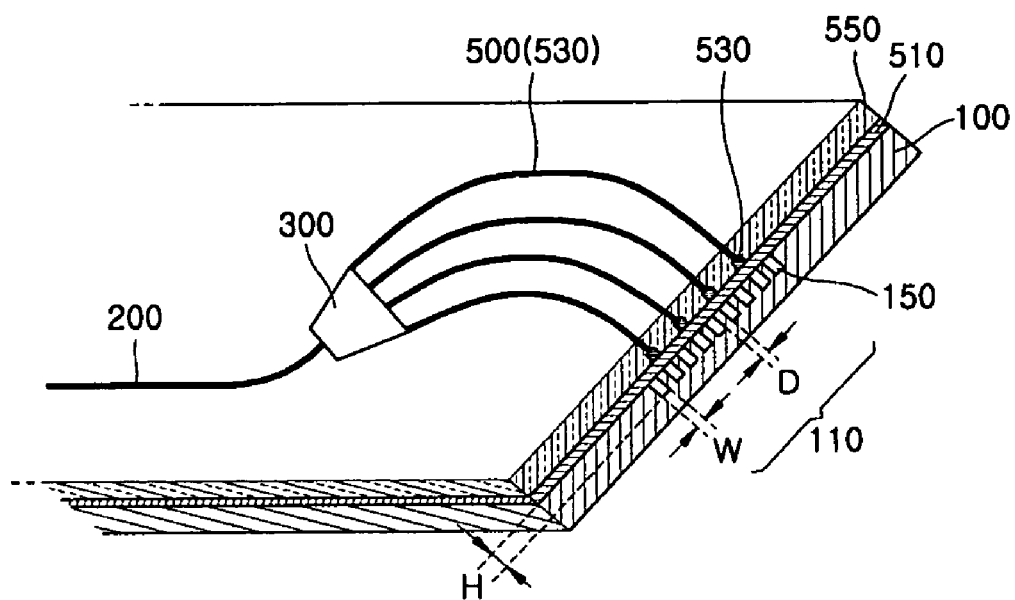
Figure 3:
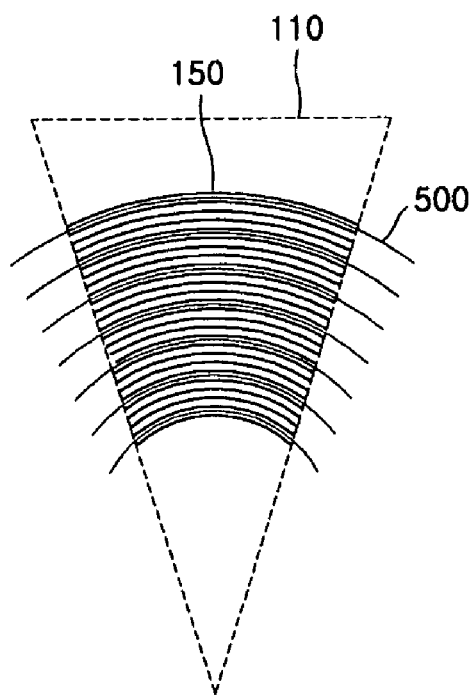

FIGS. 1 through 3 are schematic views illustrating a polymeric optical AWG device according to an embodiment of the present invention.

Referring to FIGS. 1 through 3, the polymeric optical AWG device may be realized on a substrate 100 such as a polymer substrate or a silicon (Si) wafer. Hollow trenches 150 are arrayed in a portion of a surface of the substrate 100.

An area 110 in which the hollow trenches 150 are arrayed may be a portion of a substrate area 101 in which grating channel waveguides 500 are arrayed between a first free propagation slab region 300 of an input optical waveguide 200 of the AWG and a second free propagation slab region 400 of an output optical waveguide 600 of the AWG. In general, the polymeric optical AWG device is used to divide optical signals having several wavelengths in a receiver of a WDM communication system.

In the polymeric optical AWG device, multiplexed light transmitted to the input optical waveguide 200 is diffracted and widened in the first free propagation slab region 300 and propagated to the grating channel waveguides 500 having different lengths. Since the grating channel waveguides 500 have the different lengths, the grating channel waveguides 500 and the second free propagation slab region 400 are out of phase. Thus, light having different wavelengths is condensed in different positions. The output optical waveguide 600 is installed in areas where the light having different wavelengths is condensed to branch the multiplexed light.

In the present embodiment, the hollow trenches 150 having different length proportional to length differences among the waveguides 500 are arrayed in a portion 110 shown in FIG. 1 or 3, in which the lengths of the grating channel waveguides 500 determining a wavelength characteristic of the AWG are different.

In the grating channel waveguides 500, a lower cladding layer 510, a core 530, and/or an upper cladding layer 530 or a portion of the lower cladding layer 510, the core 530, and/or the upper cladding layer 530 may be formed of a polymer. Also, the grating channel waveguides 500 may have different lengths so as to be respectively used as channels.

The hollow trenches 150 may be formed to have width W, distance, D, and height H on the surface of the substrate 100. As shown in FIGS. 2 and 3, the hollow trenches 150 may be formed to extend along the grating channel waveguides 500, depend on the lengths of the grating channel waveguides 500, and have different lengths. As shown in FIG. 3, the hollow trenches 150 may be formed in the portion 110 to have different lengths according to the length of a specific grating channel waveguide 500.

The hollow trenches 150 may be arrayed in the specific region 110 under the grating channel waveguides 500 so that the grating channel waveguides 500 on the hollow trenches 150 partially freely thermally expand without being limited by the substrate 100. Thus, the temperature dependence of the AWG can be adjusted by the partial thermal expansion of the grating channel waveguides 500 on the hollow trenches 150.

In other words, the hollow trenches 150 separate the grating channel waveguides 500 from the substrate 100 so that the grating channel waveguides 500 thermally expand according to a temperature variation. The grating channel waveguides 500 are partially separated from the substrate 100 with the thermal expansion limited by the substrate 100 and thus thermally expand according to the temperature variation due to the hollow trenches 150.

The free thermal expansion of the grating channel waveguides 500 may vary with the height H, the width W, distance D, and/or densities of the hollow trenches 150. Thus, the height H, the width W, the distance D, the distributions, the number, and/or the densities of the hollow trenches 150 may be controlled to control the thermal expansion of the grating channel waveguides 500 according to the temperature variation.

Therefore, when the refractive indexes of the grating channel waveguides 500 vary with the temperature variation, the hollow trenches 150 may be appropriately arrayed to allow the grating channel waveguides 500 to thermally expand according to the temperature variation so as to compensate for the refractive index variations. Thus, the characteristics of the grating channel waveguides 500 may be maintained regardless of the temperature. In other words, the lengths of the hollow trenches 150 may be controlled so that wavelength variations of the grating channel waveguides 500 are approximately equal to "0."

In general, a polymer film constituting waveguides separated from the substrate 100 may freely thermally expand with temperature. Thus, wavelength variations of the waveguides with temperature may offset refractive index variations of the waveguides with the temperature. Thus, the wavelengths may be changed from a negative number, for example, −0.1 nm/° C., to a positive number, for example, +0.5 nm/° C.

In the present embodiment, the lengths of the hollow trenches 150 may be controlled to control a separation of the grating channel waveguides 500 from the substrate 100. Thus, the thermal expansion of the grating channel waveguides 500 can be controlled so as to offset the refractive index variations caused by the temperature variation. As a result, the wavelength variations of the grating channel waveguides 500 with temperature can appropriately offset the refractive index variations of the polymer waveguides with temperature and thus may be equal to "0" or approximately equal to "0" regardless of the temperature variations.

The hollow trenches 150 may be filled with a thermal expansion controlling layer having a different thermal expansion coefficient from the substrate 100 and/or the grating channel waveguides 500 so as to minutely control the thermal expansion of the grating channel waveguides 500 with temperature.

Thus, as described above, in the optical device according to the present invention, the hollow trenches 150 can be formed in the substrate 100, and then the grating channel waveguides 500 may be formed. The thermal expansion controlling layer may be additionally formed to fill the hollow trenches 150.

FIGS. 4A through 4I are schematic cross-sectional views illustrating a method of manufacturing a polymeric optical AWG device according to an embodiment of the present invention.

Figure 4A:
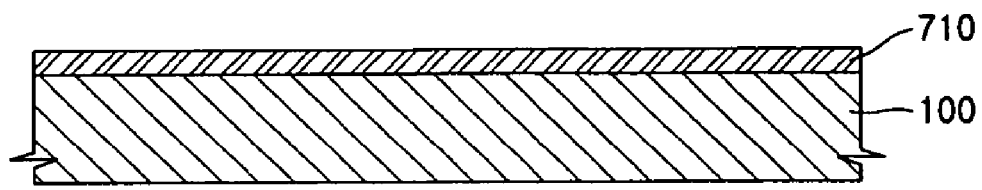
FIGS. 4A through 4I are schematic cross-sectional views illustrating a method of manufacturing a polymeric optical AWG device according to an embodiment of the present invention.

Referring to FIG. 4A, a substrate 100 in which an optical device such as the polymeric optical AWG device as shown in FIGS. 1 and 2 is to be formed is provided, and an etching mask layer 710 is formed on the substrate 100. The substrate 100 may be a polymer wafer or a silicon wafer. The etching mask layer 710 may be a photoresist layer, an oxide layer, or a metal layer. The oxide layer or the metal layer is introduced to form a hard mask.

Figure 4B:
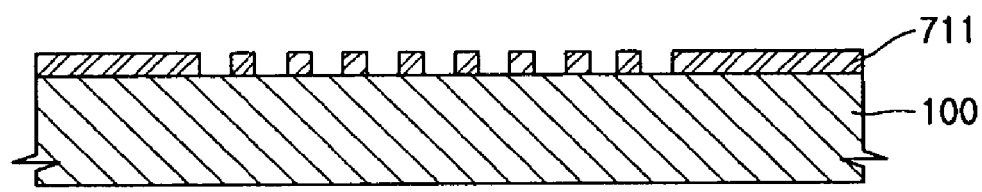

Referring to FIG. 4B, the etching mask layer 710 is patterned to form an etching mask 711. A photolithographic process of exposing and developing a photoresist layer may be used to form the etching mask 711. The etching mask 711 is formed so as to selectively expose positions in which hollow trenches 150 as shown in FIGS. 2 and 3 are to be formed.

Figure 4C:
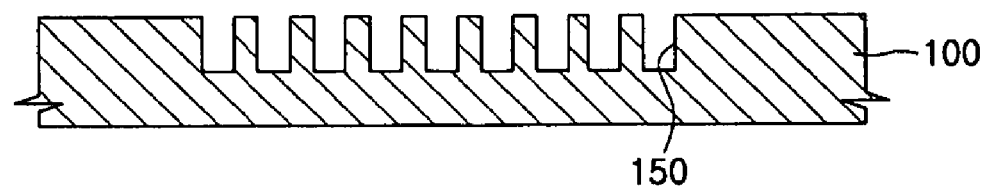

Referring to FIG. 4C, a surface of the substrate 100 exposed by the etching mask 711 is selectively etched to array the hollow trenches 150 as shown in FIGS. 2 and 3.

Figure 4D:
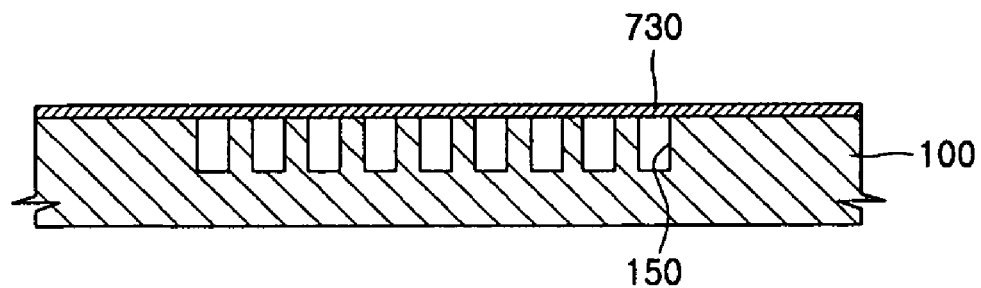

Referring to FIG. 4D, after the hollow trenches 150 are arrayed, a shield layer 730 is formed on the substrate 100 to shield entrances of the hollow trenches 150. A dry film may be coated or laminated on the surface of the substrate 100 to form the shield layer 730. The dry film may be a polymer film or a photoresist film.

Figure 4E:
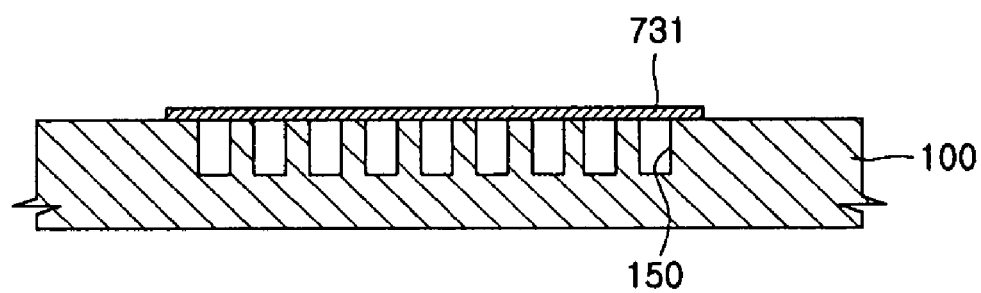

Referring to FIG. 4E, a portion of the shield layer 730 is selectively removed from a portion of the surface of the substrate 100 except for a region in which the hollow trenches 150 are arrayed to form a shield layer pattern 731 selectively covering only the region. In a case where the dry film has a photoresist characteristic, such a patterning process may be performed by directly using photolithography and etching processes on the dry film. In a case where the dry film does not have the photoresist characteristic, a photoresist may be coated and photolithography etched on the shield layer 730 to form the shield layer pattern 731.

The shield layer pattern 731 shields the entrances of the hollow trenches 150. A portion of the shield layer pattern 731 is selectively removed so that a subsequent layer is effectively adhered to the substrate 100 during a process of forming the subsequent layer.

Figure 4F:
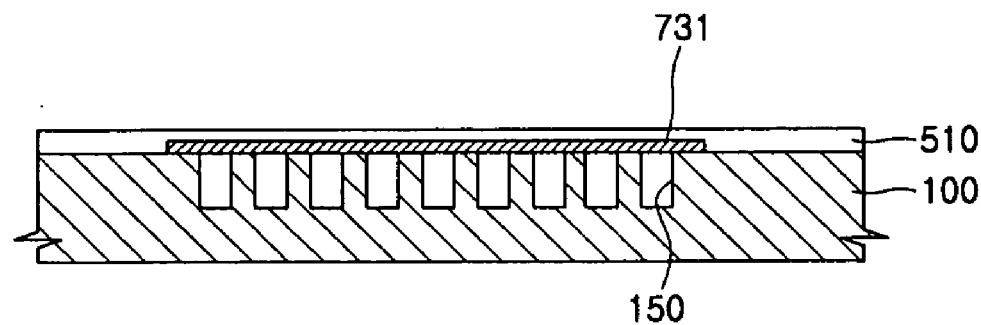

Referring to FIG. 4F, a lower cladding layer 510 is formed on the substrate 100. For example, a polymer material used for cladding is coated using spin coating and then hardened. Hardening may be performed together with thermal curing or UV radiating. Since the entrances of the hollow trenches 150 are shielded by the shield layer pattern 731, the lower cladding layer 510 can be prevented from flowing into the hollow trenches 150.

Figure 4G:
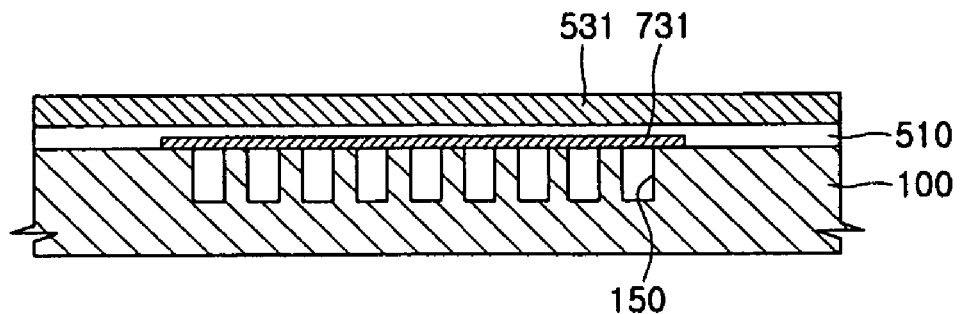

Referring to FIG. 4G, a waveguide, particularly, a layer 531 for the grating channel waveguides 500 of the AWG shown in FIGS. 1 and 2, is formed on the lower cladding layer 510. A material such as a polymer to be used as the core 530 shown in FIG. 2 may be coated using spin coating and then hardened to form the core layer 531.

Figure 4H:
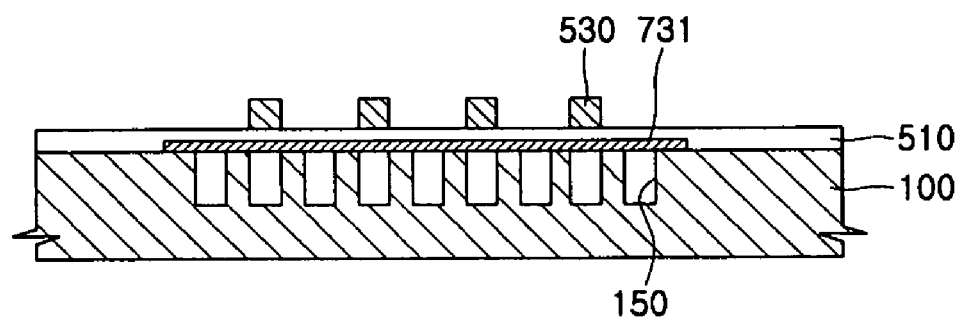

Referring to FIG. 4H, the core layer 531 is selectively etched to form the core 530. For example, a selective dry etching process including a photolithographic process is performed with respect to the core layer 531 to form patterns of waveguides.

A plurality of hollow trenches 150 are arrayed under the core 530 to prevent the dry film of the shield layer pattern 731 from hanging down. For structural stability, the plurality of hollow trenches 150 may be arrayed under the grating channel waveguide 500 so that the grating channel waveguide 500 is supported by a portion of the surface of the substrate 100 between the hollow trenches 150.

In a case where the hollow trenches 150 are covered with the dry film, air inside the hollow trenches 150 expands or shrinks with temperature. Also, the hollow trenches 150 may be connected to one another in a specific portion to prevent a pressure from being applied to the waveguides or a pathway connected to the outside from being connected to an outermost hollow trench of the hollow trenches 150. Thus, the air may flow out.

Figure 4I:
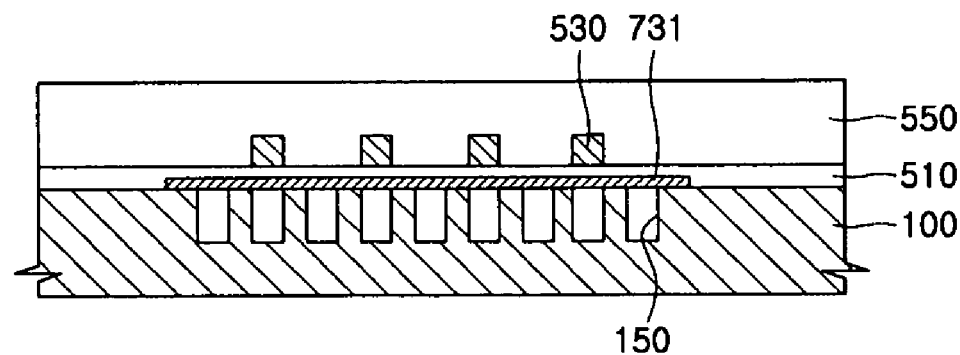

Referring to FIG. 4I, a cladding material such as a polymer is spin coated and hardened to form an upper cladding layer 550 covering the core 530. As a result, an optical device including the hollow trenches under a waveguide 500 such as the grating channel waveguides 500 of the AWG shown in FIGS. 1 and 2 can be realized.

As described with reference to FIGS. 4A through 4I, when the hollow trenches 150 of the substrate 100 are hollow, the dry film on the hollow trenches 150 is laminated. However, the hollow trenches 150 may be filled with an additional material.

FIGS. 5A through 5G are schematic cross-sectional views illustrating a modified version of the method of manufacturing the polymeric optical AWG device of FIGS. 4A through 4I according to an embodiment of the present invention.

Figure 5A:
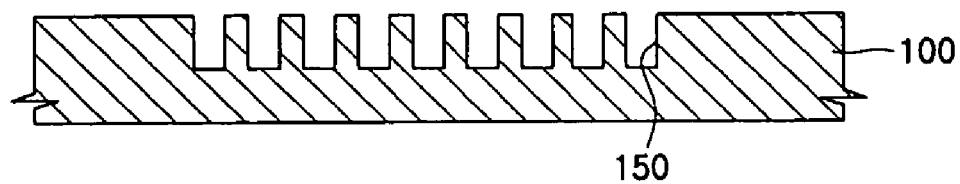
FIGS. 5A through 5G are schematic cross-sectional views illustrating a modified version of the method of manufacturing the polymeric optical AWG device of FIGS. 4A through 4I according to an embodiment of the present invention.

Referring to FIG. 5A, a substrate 100 is provided, and hollow trenches 150 as shown in FIGS. 2 and 3 are arrayed as described with reference to FIGS. 4A through 4C.

Figure 5B:
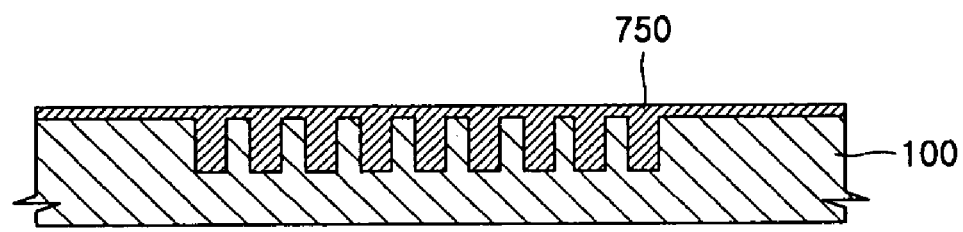

Referring to FIG. 5B, after the hollow trenches 150 are arrayed, the hollow trenches 150 in the substrate 100 are filled to form a thermal expansion controlling layer 750 controlling a thermal expansion of a waveguide 500. The thermal expansion controlling layer 750 is formed of a material having relatively greater thermal expansion coefficient than the substrate 100. Since the substrate 100, particularly, a silicon wafer, has a very low thermal expansion coefficient, a material having a relatively great thermal expansion coefficient is coated to fill the hollow trenches 150 to complement the low thermal expansion coefficient of the silicon wafer.

In general, a thermal expansion coefficient of a polymer constituting the waveguide 500 shown in FIG. 2 is substantially greater than a thermal expansion coefficient of the substrate 100. The thermal expansion controlling layer 750 filling the hollow trenches 150 is formed so that the waveguide 500 to be formed on the thermal expansion controller layer 750 freely thermally expands without being limited by the substrate 100. Here, a thermal expansion coefficient of a material constituting the thermal expansion controlling layer 750 and/or lengths, volumes, depths, widths, distributions, densities, and the like of the hollow trenches 150 may vary to effectively offset the temperature dependence of the waveguide 500.

In other words, as the hollow trenches 150 are arrayed, the temperature dependence of the optical device can be prevented. The thermal expansion coefficient of the thermal expansion controlling layer 750 may be further considered as one of the factors for controlling the temperature dependence of the optical device. Thus, other restriction factors for preventing the temperature dependence of the optical device may be used using various methods.

Figure 5C:
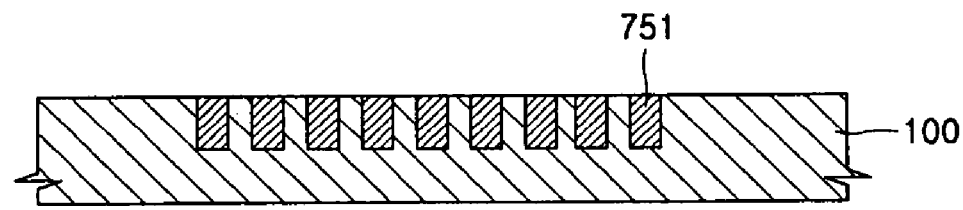

Referring to FIG. 5C, the thermal expansion controlling layer 750 is patterned to form a thermal expansion controlling pattern or filler 751. The filler 751 is formed so as to fill the hollow trenches 150. Thus, the entire surface of the thermal expansion controlling layer 750 is etched to expose a surface of the substrate 100 so as to pattern the filler 751.

The thermal expansion controlling layer 750 is patterned to form the filler 751 to prevent the substrate 100 from bending when a material having a different thermal expansion coefficient is coated on the substrate 100. A pattern of the filler 751 can effectively prevent the substrate 100 from bending.

Figure 5D:
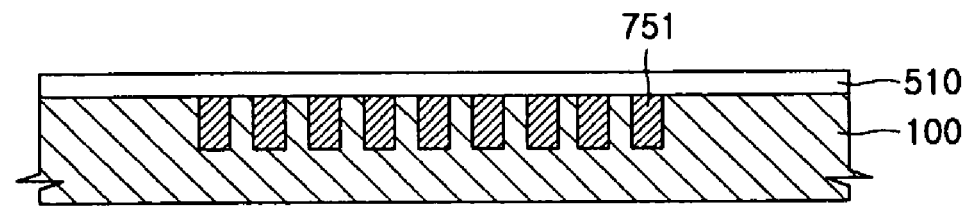

Referring to FIG. 5D, a lower cladding layer 510 is formed on the substrate 100 as described with reference to FIG. 4F. The shield layer pattern 731 described with reference to FIG. 4E may be omitted.

Figure 5E:
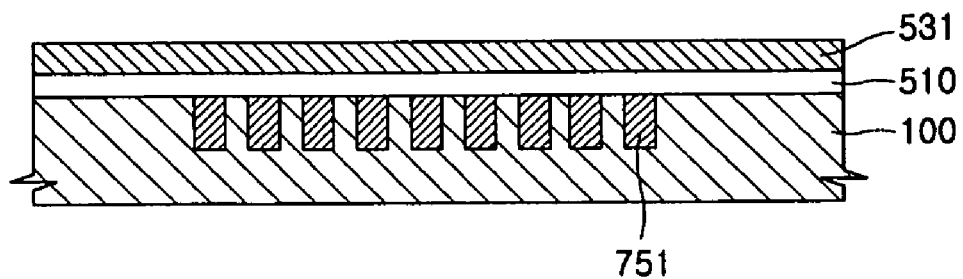

Referring to FIG. 5E, a core layer 531 for the core of the waveguide 500 shown in FIG. 2 is formed as described with reference to FIG. 4G.

Figure 5F:
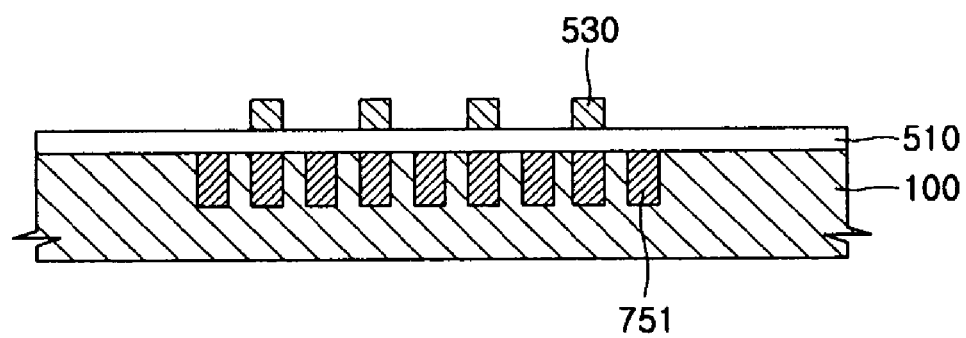

Referring to FIG. 5F, a pattern of the core 530 is formed as described with reference to FIG. 4H.

Figure 5G:
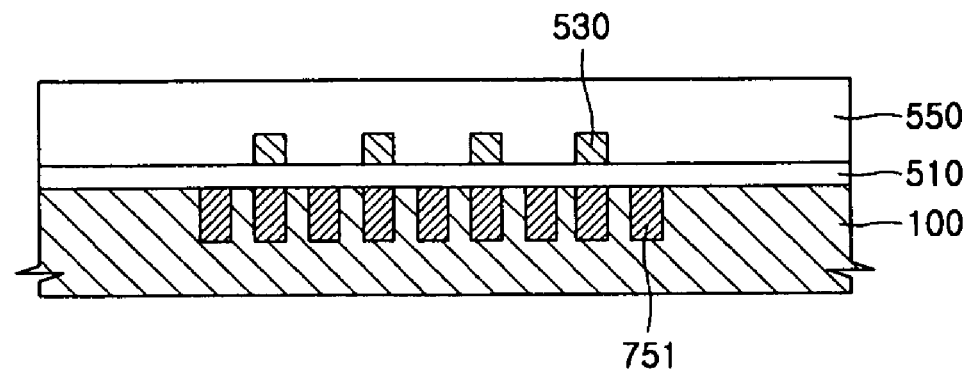

Referring to FIG. 5G, a cladding material such as a polymer may be spin coated and hardened to form an upper cladding layer 550 covering the core 530 as described with reference to FIG. 4I. As a result, an optical device including the hollow trenches 150 and the filler 751 under the waveguide 500 such as the grating channel waveguides 500 of the AWG shown in FIGS. 1 and 2 can be realized.

In the present invention, hollow trenches or fillers filling the hollow trenches are formed in a portion of a surface of a substrate such as a polymer substrate or a silicon wafer to manufacture a polymeric optical AWG device in order to control the characteristic of a material filling the hollow trenches and a number of hollow trenches and/or lengths, widths, distances, and depths of the hollow trenches so as to control the temperature dependence of the polymeric optical AWG device. The present invention can be applied to various optical devices using polymeric waveguides.

For example, another substrate such as a silica substrate besides a silicon wafer can be used. Also, the present invention can be applied to temperature-sensitive various optical devices such as a Mach Zehnder interferometer and/or a directional coupler or a multi-mode interference (MMI) device besides the AWG.

As described above, according to the present invention, hollow trenches can be formed in a portion of a surface of a substrate such as a polymer substrate or a silicon wafer. The hollow trenches can be filled with a specific material or a dry film can cover the hollow trenches, and then a polymer optical AWG device can be manufactured. Thus, a temperature characteristic of the optical device can be controlled using the number of hollow trenches, densities of the hollow trenches, widths, depths, distances and/or a magnitude of a thermal expansion coefficient of a material filling the hollow trenches and a distance between the hollow trenches.

The present invention provides a process of manufacturing a polymeric optical device to reduce the temperature dependence of a polymeric optical device. Thermal expansion coefficients of polymers constituting the polymeric optical device are relatively great. Thus, if polymer waveguides are separated from a substrate, wavelengths of the polymer waveguides are changed from a negative number to a positive number depending on the temperature variation. In the present invention, hollow trenches and/or fillers filling the hollow trenches can be formed to minutely control the variations in the wavelengths of the polymer waveguides depending on the temperature variation so that the temperature dependence of the optical device is negligible.

What is claimed is:

1. A polymeric optical AWG (arrayed waveguide grating) device comprising:
    a substrate;
    an input waveguide formed on the substrate;
    an output waveguide formed on the substrate so as to correspond to the input waveguide;
    polymeric grating channel waveguides interposed between free propagation slab regions on the substrate between the input and output waveguides and having difference lengths;
        a plurality of hollow trenches formed by selectively etching a surface of the substrate under the polymeric grating channel waveguides and allowing the polymeric grating channel waveguides to freely thermally expand from the substrate depending on a temperature variation so as to compensate for refractive indexes of the polymeric grating channel waveguides varying with the temperature variation; and
        a shield layer shielding entrances of the hollow trenches so that the polymeric grating channel waveguides do not flow into the hollow trenches, so as to separate the polymeric grating channel waveguides from the substrate.

2. The polymeric optical AWG device of claim 1, wherein the hollow trenches are arrayed in a direction along which the polymeric grating channel waveguides extend.

3. The polymeric optical AWG device of claim 1, wherein the hollow trenches are arrayed so as to have different lengths proportional to length differences among the polymeric grating channel waveguides.

4. The polymeric optical AWG device of claim 1, wherein the hollow trenches are partially arrayed in a region in which the polymeric grating channel waveguides have different lengths.

5. The polymeric optical AWG device of claim 1, wherein the hollow trenches are arrayed under one of the polymeric grating channel waveguides so that the polymeric grating channel waveguides are supported by a portion of a surface of the substrate between the hollow trenches.

6. The polymeric optical AWG device of claim 1, wherein the shield layer comprises a dry film.

7. The polymeric optical AWG device of claim 1, further comprising a filler filling the hollow trenches and comprising a material having a different thermal expansion coefficient from the substrate to control thermal expansions of the polymeric grating channel waveguides.

8. The polymeric optical AWO device of claim 7, wherein the filler comprises a polymer having a greater thermal expansion coefficient than the substrate.

9. A method of manufacturing a polymeric optical AWG device, comprising:
    forming polymeric grating channel waveguides interposed between free propagation slab regions on a substrate between input and output waveguides and having difference lengths;
    selectively etching a surface of the substrate to form under the polymeric grating channel waveguides a plurality of hollow trenches allowing the polymeric grating channel waveguides to freely thermally expand from the substrate depending on a temperature variation so as to compensate for refractive indexes of the polymeric grating channel waveguides varying with the temperature variation; and
    adhering a shield layer shielding entrances of the hollow trenches so that the polymeric grating channel waveguides do not flow into the hollow trenches, so as to separate the polymeric grating channel waveguides from the substrate.

10. The method of claim 9, wherein the forming of the hollow trenches comprises selectively etching a surface of the substrate so that the hollow trenches are arrayed in a direction along which the polymeric grating channel waveguides extend so as to have different lengths proportional to length differences among the polymeric grating channel waveguides.

11. The method of claim 9, wherein the hollow trenches are arrayed in a direction along which the polymeric grating channel waveguides extend.

12. The method of claim 9, wherein the hollow trenches are arrayed so as to have different lengths proportional to length differences among the polymeric grating channel waveguides.

13. The method of claim 9, wherein the hollow trenches are partially arrayed in a region in which the polymeric grating channel waveguides have different lengths.

14. The method of claim 9, wherein the hollow trenches are arrayed under one of the polymeric grating channel waveguides so that the polymeric grating channel waveguides are supported by a portion of a surface of the substrate between the hollow trenches.

15. The method of claim 9, further comprising before the adhering of the shield layer, forming a filler filling the hollow trenches of a material having a different thermal expansion coefficient from the substrate to control thermal expansions of the polymeric grating channel waveguides.

16. The method of claim 15, wherein a polymer having a greater thermal expansion coefficient than the substrate fills the hollow trenches to form the filler.

17. The method of claim 9, wherein the shield layer comprises a dry film.

18. A method of manufacturing a polymeric optical AWG device, comprising:

interposing polymeric grating channel waveguides between free propagation slab regions between input and output waveguides on a substrate;

forming a polymer lower cladding layer;

forming a polymer core on the polymer lower cladding layer;

forming a polymer upper cladding layer covering the core;

before forming the polymer lower cladding layer, selectively etching a surface of the substrate to form under the polymeric grating channel waveguides a plurality of hollow trenches allowing the polymeric grating channel waveguides to freely thermally expand from the substrate depending on a temperature variation so as to compensate for refractive indexes of the polymeric grating channel waveguides varying with the temperature variation; and adhering a shield layer shielding entrances of the hollow trenches so that the polymeric grating channel waveguides do not flow into the hollow trenches, so as to separate the polymeric grating channel waveguides from the substrate.

19. The method of claim 18, wherein the hollow trenches are partially arrayed in a region in which the polymeric grating channel waveguides have different lengths.

20. The method of claim 18, further comprising forming a filler filling the hollow trenches of a material having a different thermal expansion coefficient from the substrate to control thermal expansions of the polymeric grating channel waveguides.

* * * * *